(12) United States Patent
Jin et al.

(10) Patent No.: US 7,043,462 B2
(45) Date of Patent: May 9, 2006

(54) APPROXIMATE FITNESS FUNCTIONS

(75) Inventors: Yaochu Jin, Rodgau (DE); Bernhard Sendhoff, Obertshausen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 690 days.

(21) Appl. No.: 10/007,734

(22) Filed: Nov. 9, 2001

(65) Prior Publication Data
US 2002/0138457 A1 Sep. 26, 2002

(30) Foreign Application Priority Data
Nov. 14, 2000 (EP) .......................................... 00124825

(51) Int. Cl.
*G06F 15/18* (2006.01)

(52) U.S. Cl. ...................................................... 706/13
(58) Field of Classification Search .................. 706/13; 703/13
See application file for complete search history.

(56) References Cited

U.S. PATENT DOCUMENTS

| | | | |
|---|---|---|---|
| 5,148,513 A * | 9/1992 | Koza et al. ................. | 706/13 |
| 5,265,830 A | 11/1993 | Allen | |
| 5,319,781 A | 6/1994 | Syswerda | |
| 5,355,528 A | 10/1994 | Roska et al. | |
| 5,461,570 A | 10/1995 | Wang et al. | |
| 5,541,848 A | 7/1996 | McCormack et al. | |
| 5,819,244 A | 10/1998 | Smith | |
| 5,924,048 A | 7/1999 | McCormack et al. | |
| 6,449,603 B1 | 9/2002 | Hunter | |
| 6,578,018 B1 | 6/2003 | Ulyanov | |
| 6,606,612 B1 | 8/2003 | Rai et al. | |
| 6,662,167 B1 | 12/2003 | Xiao | |
| 2002/0138457 A1 | 9/2002 | Jin et al. | |
| 2004/0049472 A1 * | 3/2004 | Hayashi et al. ............. | 706/13 |

OTHER PUBLICATIONS

Yu etal," Genetic Algorithm Approach to Image Segmentation Using Morphological operations", IEEE, ICIP, Oct. 1998.*

Dasgupta, Dipankar et al., Evolutionary Algorithms in Engineering Applications, 1997, 3–23, Springer–Verlag.

Deb, K., Evolutionary Algorithms for Multi–Criterion Optimization in Engineering Design, In Miettinen et al., Evolutionary Algorithms in Engineering and Computer Science, 1999, pp. 135–161, John Wiley and Sons, Ltd., Chichester, UK.

Van Veldhuizen, David A. et al., Multiobjective Evolutionary Algorithms: Analyzing the State–of–the–Art, Evolutionary Computation, 2000, 125–147, vol. 8, No. 2, The MIT Press, Cambridge, MA.

Alain Ratle, "Optimal Sampling Strategies for Learning a Fitness Model", *Proc. of 1999 Congress on Evolutionary Computation*, vol. 3, Jul. 9, 1999, pp. 2078–2085.

(Continued)

*Primary Examiner*—George Davis
(74) *Attorney, Agent, or Firm*—Fenwick & West LLP (57) ABSTRACT

A framework for managing approximate models in generation-based evolution control is proposed. This framework is well suited for parallel evolutionary optimization that is able to guarantee the correct convergence of the evolutionary algorithm and to reduce the computation costs as much as possible. Control of the evolution and updating of the approximate models are based on the estimated fidelity of the approximate model. The frequency at which the original function is called and the approximate model is updated is determined by the local fidelity of the approximate model. By local fidelity the fidelity of the model for the region where the current population is located is designated. The lower the model fidelity is, the more frequently the original function should be called and the approximate models should be updated.

11 Claims, 6 Drawing Sheets

OTHER PUBLICATIONS

D.E. Grierson and W.H. Pak, "Optimal Sizing, Geometrical and Topological Design Using a Genetic Algorithm", *Structural Optimization*, vol. 6, 1993, pp. 151–159..

Yen–ting Chen et al., "Feature Subimage Extraction for Cephalogram Landmarking", *Proc. of the 20th Annual International Conference of the IEEE Engineering in Medicine and Biology Society*, vol. 20, Oct. 29, 1998, pp. 1414–1417.

Alain Ratle, "Accelerating the Convergence of Evolutionary Algorithms by Fitness Landscape Approximation", *Parallel Problem Solving from Nature—PPSN V. 5th International Conference Proceedings*, Sep. 1998, pp. 87–96.

J. Redmond and G. Parker, "Actuator Placement Based on Reachable Set Optimization for Expected Disturbance", *Journal of Optimization Theory and Applications*, vol. 90, No. 2, Aug. 1996, pp. 279–300.

P.K. Dash, et al., Genetic Optimization of a Self organizing Fuzzy–Neural network For Load Forecasting, Department of Electrical engineering, Regional Engineering College, Rourkela, India, 2000 IEEE, pp. 1011–1016.

Agrez; Active power estimation by averaging of the DFT coefficients; Proceedings of the 17th IEEE Instrumentation and Measurement Technology Conference; vol. 2; May 1–4 2000; pp. 630–635.

Clayton et al; Acoustic wavefield propagation using paraxial axtrapolators; Proceedings of the third conference on Hypercube concurrent computers and applications; vol. 2; Jan. 1989.

Crump; Numerical Inversion of Laplace Transforms Using a Fourier Series Approximation; Journal of the ACM (JACM); vol. 23, Is. 1; Jan. 1976.

Gupta et al., Automated test data generation using an iterative relaxation method; Proceedings of the 6th ACM SIGSOFT international symposium on Foundations of software engineering; ACM SIGSOFT Software Engineering Notes; vol. 23, Is 6; Nov. 1998.

Jin et al., On generating FC3 fuzzy rule systems from data using evolution strategies; IEEE Transactions on Systems, Man and Cybernetics Part B; vol. 29, Is. 6; Dec. 1999; pp. 829–845.

Li et al; Text enhancement in digital video using multiple frame integration; Proceedings of the seventh ACM international conference on Multimedia (Part 1); Oct. 1999.

Mitlohner; Classifier systems and economic modeling; Proceedings of the conference on Designing the future; ACM SIGAPL APL Quote Quad; vol. 26, Is. 4; Jun. 1996.

Sendhoff; Evolutionary optimised ontogenetic neural networks with incremental problem complexity during development; Proceedings of the 2000 Congress on Evolutionary Computation; vol. 2; Jul. 16–19 2000; pp. 1443–1450.

European Search Report, EP 00124825, May 14, 2001, 3 pages.

Guerin, S., "ObjectGarden Evolving The Behavior Of Agents Via A Natural Selection On Weights And Topologies Of Neural Networks," May 1999, pp. 1–15.

European Search Report, EP Application No. 00124824.4, Jun. 14, 2001.

Ishibuchi, H. et al., "Local Search Procedures in a Multi–Objective Genetic Local Search Algorithm For Scheduling Problems," IEEE, 1999. pp. 665–670.

Knowles, J. et al., "The Pareto Archived Evolution Strategy: A New Baseline Algorithm For Pareto Multiobjective Optimisation," IEEE, 1999, 98–105.

Lohn, J.D. et al., "A Comparison Of Dynamic Fitness Schedules For Evolutionary Design Of Amplifiers," 6 pages.

Tuson, A. et al., "Adapting Operator Settings in Genetic Algorithms," Final Draft of The Paper Which Will Appear in *Evolutionary Computation*, Mar. 25, 1996, pp. 1–17.

Baluja, S. et al., "Combining Multiple Optimization Runs With Optimal Dependency Trees," Jun. 30, 1997, 12 pages, CMU–CS–97–157, Justsystem Pittsburgh Research Center, Pittsburgh, PA and School Of Computer Science, Carnegie Mellon University, Pittsburgh, PA.

Baluja, S., "Population–Based Incremental Learning: A Method For Integrating Genetic Search Based Function Optimization And Competitive Learning," Population Based Incremental Learning, Jun. 2, 1994, pp. 1–41, CMU–CS–94–163, School Of Computer Science, Carnegie Mellon University, Pittsburgh, PA.

Bosman, P. et al., "Advancing Continuous IDEAs With Mixture Distributions and Factorization Selection Metrics," 6 pages, Insitute Of Information And Computing Sciences, Utretch University, Utrecht, The Netherlands.

Bosman, P. et al., "An Algorithmic Framework For Density Estimation Based Evolutionary Algorithms," Dec. 1999, pp. 1–63, Department of Computer Science, Utrecht University, Utrecht, The Netherlands.

Bosman, P. et al., "Continuous Iterated Density Estimation Evolutionary Algorithms Within The IDEA Framework," 10 pages, Department of Computer Science, Utrecht University, Utrecht, The Netherlands.

Bosman, P. et al., "IDEAs Based On The Normal Kernels Probability Density Function," Mar. 2000, pp. 1–16, Department of Computer Science, Utrecht University, Utrecht, The Netherlands.

Bosman, P. et al., "Mixed IDEAs," Dec. 2000, pp. 1–71, UU–CS–2000–45, Institute of Information and Computing Science, Utrecht University, Utrecht, The Netherlands.

Bosman, P. et al., "Negative Log–Likelihood and Statistical Hypothesis Testing as The Basis of Model Selection in IDEAs,"Aug. 2000, pp. 1–17, Department of Computer Science, Utrecht University, Utrecht, The Netherlands.

Branke, J. et al., "Faster Convergence By Means of Estimation," Oct. 1, 2002, pp. 1–9, Institute AIFB, University of Karlsruhe, Karlsruhe, Germany.

Costa, M. et al., "MOPED: A Multi–Objective Parzen–Based Estimation of Distribution Algorithm for Continuous Problems," Polytechnic of Turin, 12 pages, Turin, Italy.

Deb, K. et al., "A Computationally Efficient Evolutionary Algorithm For Real–Parameter Optimization," KanGAL Report Number 2002003, Apr. 11, 2002, pp. 1–21, Kanpur Genetic Algorithms Laboratory, (KanGAL), Indian Institute Of Technology Kanpur, Tsutsui Kanpur, India.

Deb, K. et al., "A Fast And Elitist Multi–Objective Genetic Algorithm: NSGA–ll," KenGAL Report No. 200001, 20 pages, Kanpur Genetic Algorithms Laboratory (KanGAL), Indian Institute Of Technology Kanpur, Kanpur, India.

Deb. K., "A Population–Based Algorithm–Generator For Real–Parameter Optimization,"KanGAL Report Number 2003003, 25 pages, Kanpur Genetic Algorithms Laboratory (KanGAL), Indian Institute Of Technology, Kanpur, Kanpur, India.

Deb, K. et al., "Self–Adaptation in Real–Parameter Genetic Algorithms With Simulated Binary Crossover," Gecco '99/ Genetic Algorithms, 8 pages, Kanpur Genetic Algorithms Laboratory (KanGAL), Department of Mechanical Engineering, Indian Institute Of Technology Kanpur, India and Department Of Computer Science/XI University of Dortmund, Dortmund, Germany.

Deb. K. et al., "Simulated Binary Crossover For Continuous Search Space," Nov. 1994, pp. 1–33, IITK.Me.SMD–94027, Convenor, Technical Reports, Department Of Mechanical Engineering, Indian Institute Of Technology, Kanpur, India.

De Bonet, J. et al., "MIMIC,: Finding Optima By Estimating Probability Densities," Advances in Neural Information Processing Systems, 1977, 8 pages, MIT Press, Cambridge, MA.

El–Beltagy, M. A. et al., "Metamodeling Techniques For Evolutionary Optimization Of Computationally Expensive Problems: Promises And Limitations," Genetic Algorithms And Classifier Systems, pp. 196–203.

Emmerich, M. et al., "Metamodel–Assisted Evolution Strategies," PPSN VII, LNCS 2439, 2002, pp. 361–370, Springer Verlag, Berlin, Heidelberg.

Eshelman, L. et al., "Crossover Operator Biases; Exploiting the Population Distribution, "Proceedings of the Seventh International Conference on Genetic Algorithm, 1997, pp. 354–361.

Eshelman, L. et al., "Real–Coded Genetic Algorithms and Interval–Schemata," Philips Laboratories, pp. 187–202, New York, New York, US.

Fukuda, K., "What is Voronol Diagram in $R^47$," [online]. Aug. 26, 2004 [Retrieved on Aug. 18, 2005] Retrieved from the Internet°URL:http://www.ifor.,math.ethz.ch/–fukuda/polyfaq/node29.html<.

"Genetic Algorithms For Optimization Taking Account Of Characteristics Preservation," pp. 1–110.

Graves, R.W. et al., "Acoustic Wavefield Propagation Using Paraxial Explorators," ACM, 1988, pp. 1157–1175.

Harik, G. et al., "The Compact Genetic Algorithm" IEEE, pp. 523–528.

Harik, G., "Linkage Learning Via Probabilistic Modeling In The ECGA," IlliGAL Technical Report 99010, Jan. 1999, 19 pages, Illinois Genetic Algorithms Laboratory, Department of General Engineering, Urbana, IL.

Jain, A.K. et al., "Data Clustering: A Review, "ACM Computing Surveys, Sep. 1999, pp. 264–323, vol. 31, No. 3, Michigan State University, Indian Institute Of Science and The Ohio State University.

Jimenez, D. et al., "Dynamically Weighted Ensemble Neural Networks For Classification," IEEE, 1998, pp. 753–756, The University Of Texas Health Science Center at San Antonio.

Jin, Y. et al., "Connectedness, Regularity And The Success Of Local Search In Evolutionary Multi–Objective Optimization," 8 pages, Honda Research Institute Europe, Offenbach/M, Germany.

Jin, Y. et al., "On Evolutionary Optimization With Approximate Fitness Functions," 8 pages, Future Technology Research, Honda R&D Europe (D) GmbH, Offenbach/Main, Germany.

Jin, Y. et al., "Fitness Approximation in Evolutionary Computation–A Survey," 8 pages, Future Technology Research, Honda R&D Europe (D) GmbH, Offenbach/Main, Germany.

Jin, Y. et al., "A Framework For Evolutionary Optimization With Approximate Fitness Functions," IEEE Transactions On Evolutionary Computation, Oct. 2002, pp. 481–494, vol. 6, No. 5.

Khan, N. et al., "Multi–Objective Bayesian Optimization Algorithm," IlliGAL Report No. 2002009, Mar. 2002, pp. 1–10, Illinois Genetic Algorithms Laboratory, University Of Illinois At Urbana–Champaign, Urbana, IL.

Kim, H.S. et al., "An Efficient Genetic Algorithm With Less Fitness Evaluation By Clustering,"IEEE, 8 pages,. MW Lab, Mindware, Co., Ltd., Seoul, Korea and Department of Computer Science, Yonsei University, Seoul, Korea.

Kita, H. et al., "Multi–Parental Extension of the Unimodal Normal Distribution Crossover for Real–Coded Genetic Algorithms," IEEE, 1999, pp. 1581–1588.

Kvasnicka, V. et al., "Hill Climbing with Learning (An Abstraction of Genetic ALgorithm)", Slovak Technical University, 6 pages, Bratislava, Slovakia.

Larranga, P. et al., "Optimization By Learning And Simulation Of Bayesian And Gaussian Networks," Technical Report EHU–KZAA–IK–4/99, Dec. 31, 1999, pp. 1–70 Intelligent Systems Group, Dept. Of Computer Science And Artificial Intelligence, University Of The Basque Country.

Laumanns, M. et al., "Bayesian Optimization Algorithms For Multi–Objective Optimization," 10 pages, ETH Zurich, Computer Engineering And Networks Laboratory and VUT Bmo, Faculty Of Information Technology, Bmo.

Lui, Y. et al., "Evolutionary Ensembles With Negative correlation Learning," pp. 1–27, The University Of Aizu, Fukushima Japan, The University Of Birmingham, Birmingham, U.K. and Evolvable Systems Laboratory, Computer Science Division, Ibaraki, Japan.

Liu, Y. et al., "Negative Correlation Learning," pp. 1–27, The University Of Intelligent Information Processing Systems, Spring/Summer 1997, pp. 176–185, Computational Intelligence Group, School Of Computer Science, University College, Australian Defence Force, The University Of South Wales, Canberra, Australia.

Liu, Y. et al., "Simultaneous Training Of Negatively Correlated Neural Networks In An Ensemble," IEEE Transactions On Systems, Man, And Cybermetics –Part B: Cybernetics, Dec. 1999, pp. 716–725, vol. 29, No. 6.

Lobo, F. et al., "Extended Compact Genetic Algorithm In C++," IlliGAL Report 99016, Jun. 1999, pp. 1–4, Illinois Genetic Algorithms Laboratory, Department Of General Engineering, University Of Illinois At Urbana–Champaign, Urbana, IL.

Muhlenbein, H., "The Equation For The Response To Selection And Its Use For Prediction," pp. 1–46, RWCP Theoretical Foundation GMD Laboratory, Sankt Augustin.

Muhlenbein, H. et al., "Evolutionary Algorithms: From Recombination To Search Distributions," pp. 1–39, RWCP Theoretical Foundation GMD Laboratory, Sankt Augustin.

Muhlenbein, H. et al., "Evolutionary Synthesis Of Bayesian Networks For Optimization," MIT Press.

Math6x9, Sep. 1999, pp. 1–27.

Muhlenbein, H. et al., "The Factorized Distribution Algorithm For Additively Decomposed Functions," Proceedings Of The 1999 Congress On Evolutionary Computation, 1999, IEEE Press, pp. 752–759, Real World Computing Partnership, Theoretical Foundation GMD Laboratory, Sankt Augustin, Germany.

Muhlenbein, H. et al., "FDA –A Scalable Evolutionary Algorithm For The Optimization Of Additively Decomposed Functions," Evolutionary Computation, 1999, pp. 45–68, vol. 7, No. 1, Theoretical Foundation GMD Lab, Real World Computing Partnership, GMD FZ Informationstechnik, St. Augustin.

Muhlenbein, H. et al., "From Recombination Of Genes To The Estimation Of Distributions I. Binary Parameters," 10 pages, GMD –Forschungszentrum Informationstechnik, Sankt Augustin, Germany.

Okabe, T. et al., "Evolutionary Multi Optimisation With A Hybrid Representation," 8 pages, Honda Research Institute Europe, Offenbach/M Germany.

Ono, I. et al., "A Real–Coded Genetic Algorithm for Function Optimization Using Unimodal Normal Distribution Crossover," Proceedings of the Seventh International Conference on Genetic Algoritms, pp. 246–253, 1997.

Ono, I. et al., "A Real–Coded Genetic Algorithm for Function Optimization Using Unimodal Normal Distribution Crossover," Proceedings of the Seventh International Conference on Genetic Algorithms, pp. 246–253, 1997.

Ono, I et al, "A Robust Real–Coded Genetic Algorithm Using Unimodal Normal Distribution Crossover Augmented By Uniform Crossover: Effects For Self–Adaptation Of Crossover Probabilities," 8 pages, University of Tokushimsa, Tokushima, Japan, Tokyo Institute Of Technology, Yokohama, Japan and Tokyo Institute Of Technology, Yokohama, Japan.

Optiz, D. et al., "Generating Accurate And Diverse Members Of A Neural–Network Ensemble," Advances In Neural Information Processing Systems 8, 7 pages, MIT Press, Cambridge, MA, Computer Science Department, University Of Minnesota, Duluth, MN and Computer Sciences Department, University Of Wisconsin, Madison, WI.

Paul, T. et al, "Reinforcement Learning Estimation Of Distribution Algorithm, " 12 pages, Graduate School Of Frontier Sciences, The University Of Tokyo, Tokyo, Japan.

Pelikan, M. et al., "BOA: The Bayesian Optimization Algorithm," 8 pagese, Illinois Genetic Algorithms Laboratory, Department Of General Engineering, University Of Illinois At Urbana–Champaign.

Pelikan, M. et al., "BOA: The Bayesian Optimization Algorithm, " IlliGAL Report No. 99003, Jan. 1999, pp. 1–12, Illinois Genetic Algorithms Laboratory, University Of Illinois At Urbana–Champaign, Urbana, IL.

Pelikan, M. et al., "Linkage Problem, Distribution Estimation, And Bayesian Networks," IlliGAL Report No. 98013, Nov. 1998, pp. 1–24, Illinois Genetic Algorithms Laboratory, University Of Illinois At Urbana–Champaign, Urbana, IL.

Pelikan, M. et al., "Marginal Distributions in Evolutionary Algorithms," pp. 1–6, Slovak Technical University, Bratislava, Slovakia and GMD Forschungszentrum Informationstechnik, Sankt Augustin, Germany.

Pelikan, M. et al., "A Survey Of Optimization By Building And Using Problistic Models," IlliGAL Report no. 99018, Sep. 1999, pp. 1–11, Illinois Genetic Algorithms Laboratory, University Of Illinois At Urbana–Champaign, Urbana, IL.

Perrone, M. et al., "When Networks Disagree: Ensemble Methods For Hybrid Neural Networks," Oct. 27, 1992, 15 pages, Physics Department, Neuroscience Department, Institute For Brain And Neural Systems, Brown University, Providence, R.I., To Appear In "Neural Networks For Speech And Image Processing," R. J. Mammone, ed., Chapman–Hall, 1993.

Ratle, A., "Accelerating The Convergence Of Evolutionary Algorithms By Fitness Landscape Approximation," pp. 87–96, Departement de Genie Mecanique, Universite de Sherbrooke, Quebec, Canada.

Rosen, B., "Ensemble Learning Using Decorrelated Neural Networks," To Appear in Connections Science, pp. 1–14, Computer Science Division, University Of Texas At San Antonio, San Antonio, TX.

Rousseeuw, P., "Silhouettes: A Graphical Aid To The Interpretation And Validation Of Cluster Analysis," Journal Of Computational And Applied Mathematics, 1987, pp. 53–65, Vol. 20, University of Fribourg, Fribourg, Switzerland.

Rudlof, S. et al., "Stochastic Hill Climbing With Learning By Vectors Of Normal Distributions," Aug. 5, 1996, pp. 1–11, Fraunhofer–Institut For Production Systems And Design Technology (IPK), Berlin.

Sebag, M. et al., "Extending Population–Based Incremental Learning To Continuous Search Spaces," 10 pages, Ecole Polytechnique, Palaiseau Cedex and Universite d'Orsay, Orsay Cedex.

Takahashi, M. et al., "A Crossover Operator Using Independent Component Analysis for Real–Coded Genetic Algorithms," Tokyo Institute of Technology and National Institution for Academic Degrees, 7 pages, Japan.

Thierens, D. et al., "Multi–Objective Mixture–Based Iterated Density Estimation Evolutionary Algorithms," 8 pages, Institute Of Information And Computing Sciences, Utrecht University, Utrecht, The Netherlands.

Tsutsui, S. et al., "Evolutionary Algorithm Using Marginal Histogram Models in Continuous Domain, "IlliGAL Report No. 2001019, Mar. 2001, pp. 1–16, Illinois Genetic Algorithms Laboratory, University Of Illinois At Urbana–Champaign, Urbana, Illinois.

Tsutsui, S. et al., "Multi–Parent Recombination With Simplex Crossover in Real Coded Genetic Algorithms," 8 pages, Department Of Management And Information Science, Hannan University, Osaka, Japan and Graduate School Of Interdisciplinary Science And Engineering, Tokyo Institute Of Technology, Yokohama, Japan.

Tsutsui, S. et al., "Probablistic Model–Building Genetic Algorithms Using Marginal Histograms in Continuous Domain," KES'01, N. Baba et al. (Eds.), IOS Press, 2001, pp. 112–121, Department Of Management And Information, Hannan University, Osaka, Japan and Illinois Genetic Algorithms Laboratory, Department Of General Engineering, University Of Illinois At Urbana–Champagin, Urbana, IL.

Tsutsui, S., "Sampling Bias And Search Space Boundary Extension in Real Coded Genetic Algorithms," 8 pages, Department Of Management And Information Science, Hannan University, Osaka, Japan.

Tsutsui, S. et al., "Search Space Boundary Extension Method In Real–Coded Genetic Algorithms," Information Science, May 2001, pp. 229–247, vol. 133, No. 3–4, Department Of Management And Information Science, Hannan University, Osaka, Japan and Illinois Genetic Algorithms Laboratory, University Of Illinois At Urbana–Champaign, Urbana, IL.

Tsutsui, S. et al., "Simplex Crossover And Linkage Identifications: Single–Stage Evolution vs. Multi–Stage Evolution," IEEE, 2002, 6 pages, Department Of Management And Information, Hannan University, Osaka, Japan and Illinois Genetic Algorithms Laboratory, Department Of General Engineering, University Of Illinois At Urbana–Champaign, Urbana, IL.

Tsutsui, S. et al., "Simplex Crossover And Linkage Learning In Real–Coded GAs," Genetic Algorithms: Poster Paper, p. 785, Department Of Management And Information Science, Hannan University, Osaka, Japan and Illinois Genetic Algorithms Laboratory, University Of Illinois At Urbana–Champaign, Urbana, IL.

Ueda, T. et al., "Efficient Numerical Optimization Technique Based On Real–Coded Genetic Algorithm," Genome Informatics, 2001, pp. 451–453, vol. 12, Graduate School Of Bioresource And Bioenvironmental Sciences, Kyushu University, Fukuoka, Japan and Department Of Biochemical Engineering and Science, Kyushu Institute Of Technology, Fukuoka, Japan.

Ulmer, H. et al., "Model–Assisted Steady–State Evolution Strategies," 12 pages, Center For Bioinformatics Töbingen (ZBIT), University of Töbingen, Töbingen, Germany.

Yao, X. et al., "Making Use Of Population Information In Evolutionary Artificial Neural Networks," IEEE Transactions On Systems, Man, And Cybernetics, Jun. 1998, pp. 417–425, vol. 28, No. 3.

Zhang, B., "A Bayesian Framework for Evolutionary Computation," IEEE, 1999, pp. 722–728.

Zhang, B. et al., "Building Optimal Committees Of Genetic Programs," pp. 1–10, Artificial Intelligence Lab (SCAI) School Of Computer Science And Engineering, Seoul National University, Korea.

Harik, G. et al., "The Compact Genetic Algorithm," IlliGAL Report No. 97006, Aug. 1997, pp. 1–21, Illinois Genetic Algorithms Laboratory, Department Of General Engineering, University Of Illinois At Urbana–Champaign, Urbana, IL.

* cited by examiner

Fig. 1

Prior Art

Fig. 5 Blade optimization with approximate models (a) Pressure loss (b) Outflow angle.

(a)

(b)

Fig. 6 Blade optimization with approximate models (a) Pressure loss (b) Outflow angle.

APPROXIMATE FITNESS FUNCTIONS

This application is related to U.S. patent application Ser. No. 10/007,906, filed on Nov. 9, 2001 by Y. Jin and Dr. B. Sendhoff, titled "Multi-Objective Optimization."

BACKGROUND OF THE INVENTION

The present invention relates to a method for the evolutionary optimization, to a computer software program for executing such a method as well as to the use of such a method for the optimization of aerodynamic structures.

Figure 1:
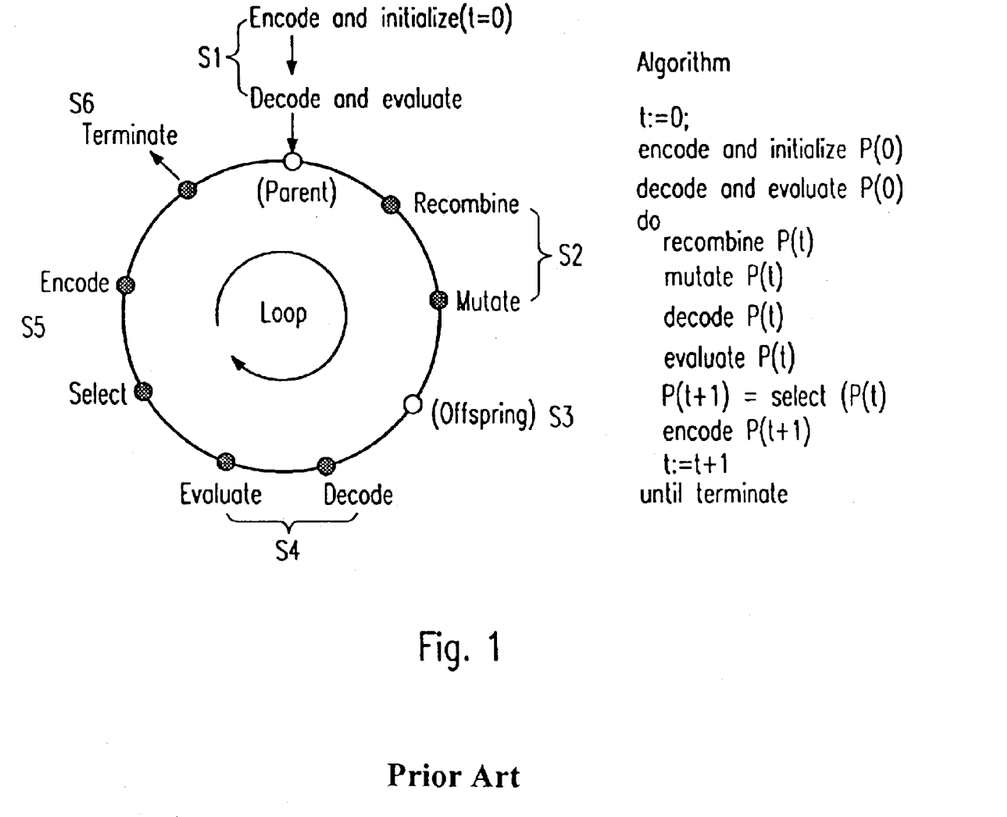
FIG. 1 shows a graphical representation of a generation cycle of an evolution strategy.

With reference to FIG. 1 at first the well-known cycle of an evolutionary algorithm will be explained.

In a step 1 the object parameters to be optimized are encoded in a string called individual. A number of such individuals are randomly generated that comprises the initial parent generation and the quality (fitness) of each individual in the parent generation is evaluated. In a step S2 the parents are reproduced by applying genetic operators called mutation and recombination. Thus, a new generation is reproduced in step S3, which is called the offspring generation. The quality of the offspring individuals is evaluated using a fitness function which is the objective of the optimization in step S4. Finally, depending on the calculated quality value, step S5 selects the best offspring individuals (survival of the fittest) which are used as parents for the next generation cycle if the termination condition in step S6 is not satisfied.

Before evaluating the quality of each individual, decoding may be needed depending the encoding scheme used in the evolutionary algorithm. Note that the steps S2, S3, S4, S5 and S6 are cyclically repeated until the condition for termination of the optimization in step S6 is satisfied.

The algorithm of this evolutionary optimization can be expressed by the following pseudo-code:

t:=0
encode and initialize P(0)
decode and evaluate P(0)
do
   recombine P(t)
   mutate P(t)
   decode P (t)
   evaluate P (t)
   P(t+1)=select P(t)
   encode P (t+1)
   t:=t+1
until terminate Such evolutionary algorithms are known to be robust optimizers that are well suitable for discontinuous and multi-modal objective functions. Therefore, evolutionary algorithms have successfully been applied to mechanical and aerodynamic optimization problems, including preliminary turbine design, turbine blade design, multi-disciplinary rotor blade design, multi-disciplinary wing platform design and a military airframe preliminary design.

Details on the evolutionary algorithms can be found in Dasgupta et al. "Evolutionary Algorithms in Engineering Applications", Springer-Verlag, 1997 and Miettinnen et al., "Evolutionary Algorithms in Engineering and Computer Science", John Wiley and Sons. 1999.

One essential difficulty in generation-based approaches to aerodynamic optimization is the huge time consumption due to the high complexity of the aerodynamic analysis and the large number of evaluations needed in the evolutionary optimization. To address this problem, several methods have been developed for constructing approximate models.

One widely used method in design engineering is the Response Surface Methodology, which uses low-order polynomials and the least square estimations.

A more statistically sound method is the Kriging model, which is also called the Design and Analysis of Computer Experiments (DACE) model. In this method, a global polynomial approximation is combined with a local Gaussian process and the Maximum Likelihood is used for parameter estimation. Artificial neural networks, including Multi-layer Perceptrons (MLP) and Radial Basis Function Networks (RBFN) have also been employed to build approximate models for design optimization.

A MLP neural network can be used for building an approximate model. However, it is generally difficult to get a model with sufficient approximation accuracy. One of the problems is the lack of training data for the neural network, because for many real application data collection is a computationally expensive process. This is especially true when the dimension of the problem space is high. Due to this, the approximate model may be of low fidelity and may even introduce false optima. In this case, measures need to be taken to guarantee the correct convergence of the optimization algorithm when approximate models are used.

Managing approximate models in optimization based on evolutionary algorithms has not caught much attention so far. It is known to use a heuristic convergence criterion to determine when the approximate model must be updated. The basic idea is that the convergence of the search process should be stable and therefore, the change of the best solution should not be larger than a user-defined value. An assumption is that the first sets of data points are at least weakly correlated with the global optimum of the original problem, which is not necessarily true for high dimensional systems.

An approach to coupling approximate models with evolutionary algorithm has been proposed in an attempt to balance the concern of optimization with that of design of experiments. The main idea is to maintain the diversity of the individuals and to select those data points that are not redundant for model updating (online learning). In this method, the decision of when to carry out the on-line learning of the approximate model is simply based on a prescribed generation delay.

Most recently it has been proposed to train a neural network with some initial samples to approximate the NK model. During evolution, the fittest individual in the current population is evaluated on the original fitness function for every 50 generations. This individual then replaces the one with the lowest fitness in the training set and the neural network is retrained. It has been found that the evolutionary algorithm becomes misled by the neural network model when the complexity of the original fitness landscape is high. The common weakness in the above methods is that neither the convergence properties of the evolutionary algorithm with approximate fitness functions (correct convergence is assumed) nor the issue of model management is addressed.

SUMMARY OF THE INVENTION

In view of the above it is the object of the present invention to reduce the computation time and complexity when managing approximate models for fitness functions. At the same time the convergence properties of the algorithm should essentially not be degraded.

Therefore, a framework for model management with generation based control is proposed. Generally, generation based evolution control is more suitable when the evaluation of the fitness function is implemented in parallel. The main idea is that the frequency at which the original computationally expensive function is called and the approximate model is updated should be determined by the local fidelity of the approximate model. By local fidelity, the fidelity of the model for the region where the current population is located is meant. The lower the model fidelity is, the more frequently the original function should be called and the approximate model should be updated. Since it is hardly possible to build a globally correct approximate model for problems with large dimensionality of the design space, a local model is of more practical importance. With this strategy, the computational cost can be reduced as much as possible while the correct convergence of the evolutionary algorithm can be guaranteed.

The above object is particularly achieved by means of the features of the independent claims. The dependent claims develop further the central idea of the invention.

According to the present invention therefore a method for the evolutionary optimization with approximate fitness functions is proposed. At first an initial design is set up. The initial design is reproduced to create a plurality of offsprings. The quality of the offsprings is evaluated by means of a fitness function. Finally, the offsprings having the highest evaluated quality value are selected for the next generation cycle. Selectively, an original fitness function or an approximate fitness function can be used for the quality evaluation step. According to the invention the frequency of the use of the original fitness function is adaptively adjustable during the optimization process (online adaptation).

The approximate fitness function can be refined (updated) on every use of the original fitness function.

A covariance matrix of the probability density function adapted during the evolutionary optimization can be used for weighting new samples on every update of the approximate fitness function.

The fidelity of the approximate fitness function can be estimated locally on every use of the original fitness function to adjust the future frequency of use of the original fitness function.

On every use of the original fitness functions the current model error can be calculated on the basis of the difference of the result of using the original fitness function and the approximate fitness function, respectively. The future frequency of use of the original fitness function can then be adapted (online) on the basis of the current model error.

The approximate fitness function can be implemented by means of a neural network model.

According to a further aspect of the present invention a computer software program for executing such a method is proposed.

According to the present invention such a method can be used for structural optimization problems, particularly the optimization of aerodynamic bodies, in which case the original function can be calculated by a Navier-Stokes solver.

Further aspects, objects, features and advantages of the present invention will become evident for the man skilled in the art when reading the following detailed description of an embodiment taken in conjunction with the figures of the enclosed drawings.

DETAILED DESCRIPTION OF THE PREFERRED EMBODIMENTS

Figure 2:
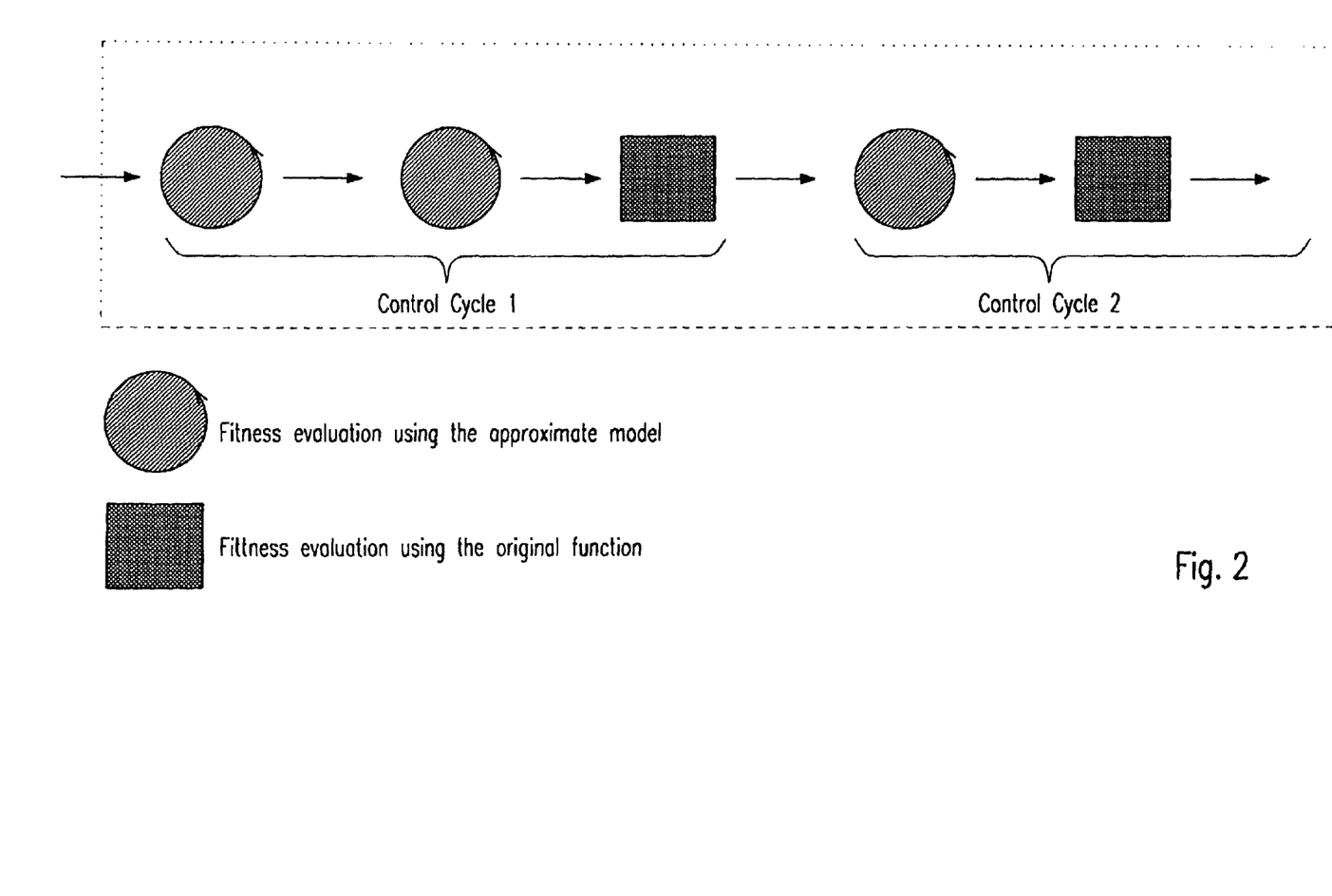
FIG. 2 is a schematic representation of control cycles using an approximate model or an original function.

FIG. 2 shows the technique of calculating a fitness evaluation using both approximate models (for example implemented by means of neural network models) and the original function according to adaptive control cycle. A control cycle is terminated by one fitness evaluation using the original function preceded by no, one or a plurality of fitness evaluations using the approximate model. Obviously the original function is not used for every generation in a control cycle. The control cycle 1 in FIG. 2 is composed of two generations using the approximate model and is terminated by one generation using the original function, whereas the control cycle 2 is composed of one generation using the approximate model and is terminated by one generation using the original function. In this example at the end of the control cycle 1 it has been decided to increase the frequency of use of the original function.

Figure 3:
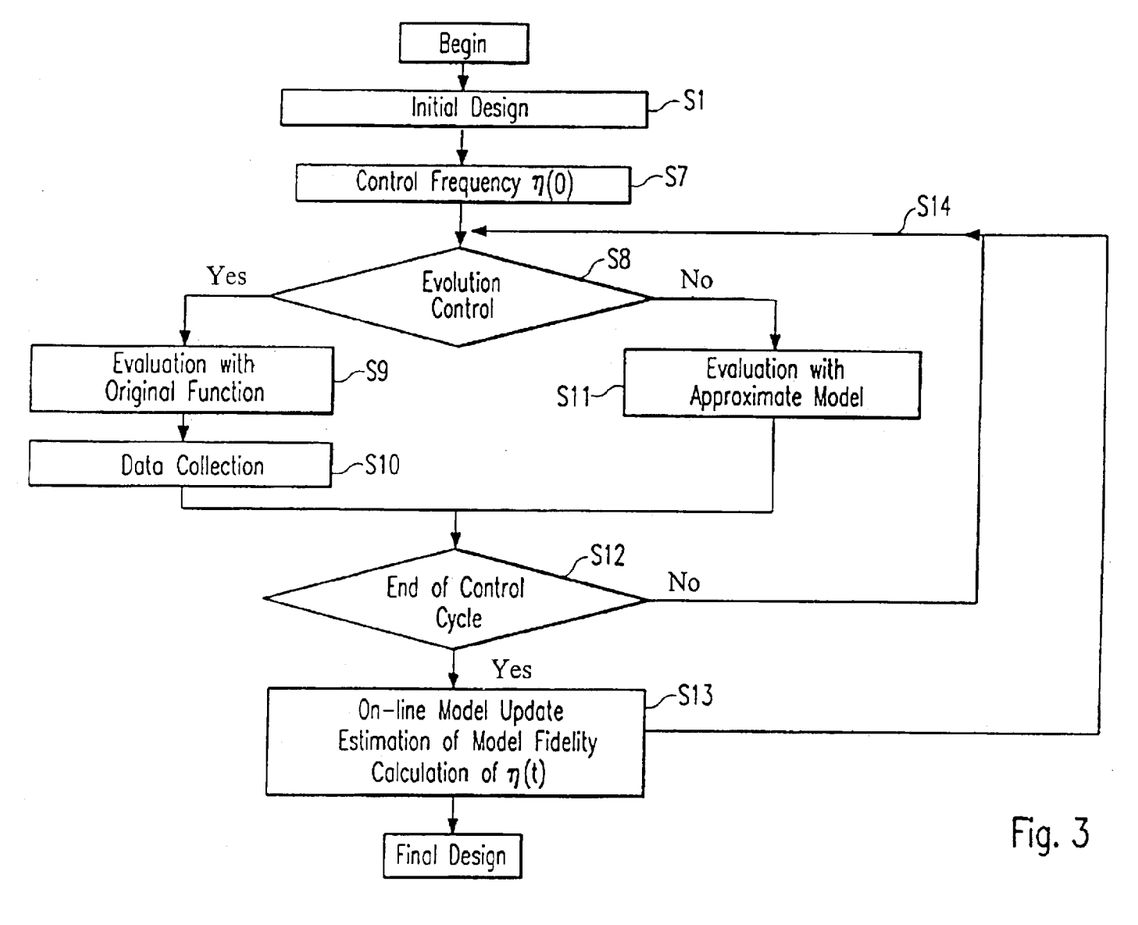
FIG. 3 shows a flow chart for the online adaptation of the use frequency of an original fitness function.

FIG. 3 shows a flow chart of a process of the present invention for online adaptation of the use frequency $\eta(t)$ of the original function, wherein t is the generation number. After the begin the initial design is fixed in step S1. Then an initial control frequency $\eta(0)$ is fixed in step S7. Depending on the control frequency $\eta(t)$ in an evolution control step S8 it is decided whether the evaluation of the fitness should be performed with the original function (step S9) or with the approximate model (step S11). Usually the evolution control step S8 is designed such that the original function is used in step S9 to terminate a control cycle.

In case the original function is used in step S9 for the evaluation, the data of the result of this evaluation are collected in step S10.

At the end of a generation cycle (composed of steps S2 to S6 as explained with reference to FIG. 1) it is decided in step S12 whether the current control cycle is finished. If not, the processing goes back in a step S14 to the evolution control decision step S8. If the end of a control cycle is reached, go to step S13 in which the approximate model (the neural network) is updated using the data collected in step S10. Based on an estimation of the model fidelity (as will be explained later on) the future use frequency of the original function $\eta(t)$ is calculated in step S13. Depending on the requirements and the result of the evolution steps S9 or S11, respectively, either the final design is output or the processing goes back in step S14 to the evolution control decision step S8 to start a new control cycle.

The theoretical background of the present invention will now be explained.

The canonical Evolution Strategy (ES) operates on an n-dimensional vector $\vec{x} \in \mathbb{R}^n$. The main operator in ES is the mutation operator. However, unlike in the canonical genetic algorithm (GA), the mutation operator obtains a direction during search due to the self-adaptation of the strategy parameters. The combination of the genotypes from different parents, carried out by the recombination operator in ES or the crossover operator in GA, usually plays a less significant role or is completely omitted like in this study. The Evolution Strategy is typically combined with a deterministic selection method, either with elitism, i.e., $(\mu+\lambda)$-ES, or without elitism, i.e., $(\mu,\lambda)$-ES. At the same time, the combination with other selection methods, e.g., the EP tournament selection is known to be successful. The $(\mu,\lambda)$-ES is applied here, thus $\mu$ new individuals are only selected from the $\lambda$ offspring. The canonical Evolution Strategy (ES) can be described as follows:

$$\vec{x}(t) = \vec{x}(t-1) + \vec{z} \qquad (1)$$

$$\sigma_i(t) = \sigma_i(t-1)\exp(r'z)\exp(rz_j), \forall i \in \{1, \ldots, n\} \quad (2)$$

$$\vec{x}, \vec{z} \in IR^n; \; z_j, z \sim N(0,1); \; \vec{z} N(\vec{0}, \vec{\sigma}(t)^2) \qquad (3)$$

where $\vec{x}$ is the parameter vector to be optimized and $r$, $r'$ and $\sigma_i$ are the strategy parameters. The values for $r$ and $r'$ are fixed to $$r = (\sqrt{2}\sqrt{n})^{-1}; \; r' = (\sqrt{2n})^{-1} \qquad (4)$$

The $z_j$, $z$ and $\vec{z}$ are normally distributed random numbers and a random number vector, respectively, which characterize the mutation exercised on the strategy and the objective parameters. The $\sigma_i$ are also called step-sizes and are subject to self-adaptation, as shown in equation (2). Since they define the variances $\sigma_i^2$ of the normal probability distribution, equation (3), for the mutation in equation (1), they stochastically define a direction and a step-length of the search process in the n-dimensional space. However, arbitrary directions can only be represented by correlated mutations, i.e., the covariance matrix of the normal distribution should have non-zero off-diagonal elements. Such correlated mutations are realized by the Covariance Matrix Adaptation (CMA) algorithm.

The derandomized Covariance Matrix Adaptation (CMA) differs from the standard ES mainly in three respects:

In order to reduce the stochastic influence on the self-adaptation, only one stochastic source is used for the adaptation of both objective and strategy parameters. In the derandomized approach the actual step length in the objective parameter space is used to adapt the strategy parameter. Therefore, the self-adaptation of the strategy parameters depends more directly on the local topology of the search space. In the case of the adaptation of one strategy parameter, this can be written as $$\sigma(t) = \sigma(t-1)\exp\left(\frac{1}{d}(|\vec{z}| - E[|N(\vec{0}, \vec{1})|])\right) \qquad (5)$$

$$\vec{x} = \vec{x}(t-1) + \sigma(t)\vec{z} \qquad (6)$$

$$\vec{z} \approx N(\vec{0}, \vec{1}).$$

Therefore, in the derandomized approach the actual step length in the objective parameter space is used to adapt the strategy parameter. This results in the following, simple, however successful, effect: If the mutation was larger than expected ($|\vec{z}| > E[|N(\vec{0}, \vec{1})|]$), then the strategy parameter is increased. This ensures that if this larger mutation was successful (i.e. the individual was selected), then in the next generation such a larger mutation will again occur, because $u(t)$ was increased. The same argumentation holds if ($|\vec{z}| < E[|N(\vec{0}, \vec{1})|]$) The parameter d is used to regulate the adaptation.

The second aspect is the introduction of the cumulative step size adaptation. Whereas the standard evolution strategy extracts the necessary information for the adaptation of the strategy parameters from the population (ensemble approach), the cumulative step size adaptation relies on information collected during successive generations (time averaged approach). This leads to a reduction of the necessary population size. The cumulation of steps is termed evolution path by Ostermeier and Hansen and is formally expressed as:

$$\vec{s}(t) = (1-c)\vec{s}(t-1) + c_R \vec{z} \qquad (7)$$

The factor $c$ determines the length of the evolution path and the factor $c_R = \sqrt{c(2-c)}$ is needed for normalization, which can be seen by calculating the variance of $\sqrt{s}(t)$ in the limit $t \to \infty$.

In the CMA algorithm, the full covariance matrix $\vec{C}$ of the probability density function $$f(\vec{z}) = \frac{\sqrt{\det(\vec{C}^{-1})}}{(2\pi)^{n/2}} \exp\left(-\frac{1}{2}(\vec{z}^T \vec{C}^{-1} \vec{z})\right) \qquad (8)$$

for the mutation of the objective parameter vector. The following description of the CMA algorithm follows the one given in N. Hansen and A. Ostermeier, "Adapting arbitrary normal mutation distributions in evolutions strategies: The covariance matrix adaptation", in Proc. 1996 IEEE Int. Conf. On Evolutionary Computation, pages 312–317, IEEE Press, 1996, details of the implementation can be found in M Kreutz, B. Sendhoff, and Ch. Igel, "EALib: A C++ class library for evolutationary algorithms", Institut für Neuroinformatik, Ruhr-Universitat Bochum, 1.4 edition, March 1999.

If the matrix B satisfies $\vec{C} = \vec{B}\vec{B}^T$ and $z_j \sim N(0,1)$, then $\vec{B}\vec{z} \sim N(0, \vec{C})$. The adaptation of the objective vector is given by:

$$\vec{x}(t) = \vec{x}(t-1) + \delta(t-1)\vec{B}(t-1)\vec{z}, \; z_j \sim N(0,1) \qquad (9)$$

where $\delta$ is the overall step size. The adaptation of the covariance matrix is implemented in two steps using the cumulative step size approach ($c_{cov} \in (0,1)$ and $c \in (0,1)$) determine the influence of the past during cumulative adaptation).

$$\vec{s}(t) = (1-c)\vec{s}(t-1) + c_u \vec{B}(t-1)\vec{z} \qquad (10)$$

$$\vec{C}(t) = (1-c_{cov})\vec{C}(t-1) + c_{cov} \vec{s}(t)\vec{s}^T(t) \qquad (11)$$

The next step is to determine the matrix $\vec{B}$ from $\vec{C}$. Since $\vec{C} = \vec{B}\vec{B}^T$ is not sufficient to derive $\vec{B}$, the Eigenvectors of $\vec{C}$ are chosen as column vectors. The reason is that in the last step the overall step size $\delta$ has to be adapted. In order to perform this adaptation, the expected length of the cumulative vector $\vec{s}_\delta$ has to be known.

Therefore, the variation vector should be $N(\vec{0}, \vec{1})$ distributed.

$$\vec{s}_{67}(t) = (1-c)\vec{s}_\delta(t-1) + c_u \vec{B}_\delta(t-1) \qquad (12)$$

$$\delta(t) = \delta(t-1) \cdot \exp(\beta \|\vec{s}_\delta(t)\| - \hat{x}_n) \qquad (13)$$

$\vec{B}_\delta$ equals $\vec{B}$ with normalized columns in order for $\vec{B}_\delta(t-1)\vec{z}$ to be $N(0,\vec{1})$ distributed. $\hat{x}_n$ denotes the expectation of the $x_n$ distribution, which is the distribution of the length of an $N(0,\vec{1})$ distributed random vector.

The CMA algorithm relies on several external parameters which have to be fixed manually.

Parallel Implementation of the Evolutionary Algorithm

The basic motivation to implement an evolutionary algorithm in parallel is to reduce the processing time needed to reach an acceptable solution. This is badly in need when the evaluation of the fitness takes a large amount of time. There are several approaches to parallelization and the one adopted here is the global parallelization. In this approach there is one single population and the evaluation of the individuals is done in parallel. For design problems, the evaluation of the individuals usually takes up the overwhelming part of the total time consujption, therefore, a sub-ilinear speed-up can be achieved if the global parallelization approach is used. The hardware for the implementation of parallel evolutionary algorithms can be very different. In our case, a network of computers with multi-processors is used. The implementation of the parallelization is realized with the Parallel Virtual Machines library.

Empirical Convergence Studies and Evolution Control

Convergence of the Evolution Strategy with Neural Networks for Fitness Evaluations Now the convergence properties of the evolution strategy when a trained multilayer perceptron (MLP) neural network is used for fitness evaluations will be evaluated.

The investigation is carried out on two benchmark problems, the Ackley function and the Rosenbrock function. The Ackley function is a continuous, multimodal test function, which has the following form:

$$f_1(\vec{x}) = -20\exp\left(0.2\sqrt{\frac{1}{n}\sum_{i=1}^{n} x_i^2}\right) - \exp\left(\frac{1}{n}\sum_{i=1}^{n}\cos 2\pi x_i\right) + 20 + e \quad (14)$$

where n is the dimension of the function. A neural network is trained to approximate the 2D Ackley function. In the simulation, 600 training data are collected from one run of evolution with the Ackley function as the objective function. This is to simulate the situation that training data are only available from earlier optimization attempts in real world applications. The MLP network used has one hidden layer with 20 nodes.

A false minimum exists near $(x_1,x_2)=(1,-4)$. This can be ascribed to the poor distribution of the training samples. Such samples can be used to simulate the situation frequently encountered in practice, i.e. sparse and poorly distributed training data. Recall that for the discussed problems data collection is expensive. If the evolutionary algorithm is run with this neural network model, the algorithm converges to the false minimum, which is an expected result.

To show that the identified problem is a general one, simulations are also conducted oil the Rosenbrock function.

$$f(\vec{x}) = \sum_{i=1}^{n} \left[10(x_i^2 - x_{i+1})^2 + (x_i - 1.0)^2\right] \quad (15)$$

For his function, the evolutionary algorithm is expected to easily find a near minimum but difficult to locate the global minimum. The output of the fitness function spans from thousands to zero and therefore it becomes a little more difficult for the neural network to learn the mapping. The simulation is conducted on the 2-D Rosenbrock function. Similarly 150 samples are generated from one run of evolution on the 2-D Rosenbrock function, which is much smoother compared to the Ackley function.

Comparing it with the true 2-D Rosenbrock function, it is seen that the left ram of the 2D-Rosenbrock function becomes almost flat due to the poor distribution of the training data. No doubt, evolution with this neural network model is vulnerable to serious errors, because the global minimum of this approximate model lies in the area where the true value is very large. Therefore, an evolutionary optimization based on such an approximate model will converge to the false minimum.

Adding Random Samples

One straightforward idea of dealing with the problem is to add some randomly generated samples for neural network training, first without considering the cost of data generation. In the simulation, 150 random samples are added to the original training data, both for the 2-D Ackley function and the 2-D Rosenbrock function. It is found that the neural networks are able to learn the main features of the functions and no false minima are present. This is confirmed by running the evolution process with the neural network model as the fitness function, in which a near-optimum is found for both functions.

Unfortunately, adding random samples does not work for high-dimensional systems. To illustrate this, simulations are conducted on the 12-D Ackley function and the 12-D Rosenbrock function. In both cases, 450 randomly generated samples are added to 1000 training data. 450 random samples are added just because in real applications, it is impossible to have as much data as needed. Despite that the neural networks have achieved a good approximation on the training data, incorrect convergence has occurred for both functions.

Improvement of Convergence with Controlled Evolution

In the last subsection, it was shown that using additional training samples is not effective to deal with the problem of "incorrect" convergence of evolutionary algorithms with neural network models. Therefore the concept of evolution control is introduced. Two methods are proposed:

Controlled Individuals:

In this approach, part of the individuals ($\eta$) in the population ($\lambda$ in total) are chosen and evaluated with the real fitness function. If the controlled individuals are chosen randomly, it can be called a random strategy. If the best $\eta$ individuals are chosen as the controlled individuals, it is called a best strategy.

Controlled Generations:

In this approach, the whole population of $\eta$ generations will be evaluated with the real fitness function in every $\lambda$ generations, where $\eta \leq \lambda$.

Furthermore, when controlled individuals or controlled generations are introduced, new training data are available. Therefore, on-line learning of the neural network will be applied to improve the approximation of the network model in the region of optimization and in turn to improve the convergence of the evolutionary algorithm.

First the individual based methods for the 12-D Ackley function are investigated. To determine the number of individuals ($\eta$) that need to be evaluated using the original fitness function to guarantee correct convergence, an $\eta=1, 2, \ldots, 11$ is tested for both the random strategy and the best strategy for a $(\mu,\lambda)=(3, 12)$-ES.

All the results are averaged over 10 runs. It can be seen that for the random strategy, convergence of the evolutionary algorithm is not achieved until $\eta \geq 9$. When 5 out of 12 individuals are evaluated with the real fitness function, the reported best fitness is close to the true fitness. When η is larger than 7, a near-optimum is found.

When some of the individuals are evaluated using the real fitness function, new data are available and on-line learning can be implemented. In the following, it is investigated in which way the algorithm can benefit, if these newly available data are used to train the neural network on-line. The evolutionary algorithm reports a correct fitness when only 2 individuals are evaluated with the real fitness function. When about 50% of the whole population are evaluated with the real fitness function, a good near-optimal or optimal solution is found.

Similar results have been obtained for the 12-D Rosenbrock function. It is seen that when $\eta \geq 6$, the algorithm converges to the correct fitness value and a near-optimal solution is found. When on-line learning is introduced, the convergence properties improve considerably and the resulting solution is near-optimal when $\eta \geq 5$. In both cases, the results are based on an average of 10 runs.

It is shown that the best strategy works much better than the random strategy and on-line learning can further improve the convergence properties.

A Framework for Managing Approximate Models

Now a framework for managing approximate models in evolutionary optimization is suggested. Taking into account the fact that parallel evolutionary algorithms are often used for design optimization, the generation-based evolution control strategy is used in this framework.

Generation-Based Evolution Control

As explained above, generation-based evolution control is one of the approaches to guarantee the correct convergence of an evolutionary algorithm when the approximate fitness model has false minima. The idea in the generation based evolution control is that in every λ generations there are η generations that will be controlled, where $\eta \leq \lambda$. η should be generally larger than λ/2 to ensure the correct convergence when false global minima are present in the approximate model. However, an adaptive control frequency (η/λ) is proposed so that the calls of the original expensive fitness function can be reduced as much as possible without affecting the correct convergence of the algorithm.

Determination of Control Frequency

The higher the fidelity of the approximate model is, the more often the fitness evaluation can be made using the model and the smaller η can be. However, it is very difficult to estimate the global fidelity of the approximate model. Thus, a local estimation of the model fidelity is used. This is feasible because the evolution strategy generally proceeds with small steps, i.e., with the normal distribution small mutations are most likely. Therefore the current model error is used to estimate the local fidelity of the approximate model and then to determine the frequency at which the original fitness function is used and the approximate model is updated. The frequency is denoted by η/λ. When λ is fixed, the frequency is solely determined by η.

To get a proper η, heuristic fuzzy rules can be derived as follows:

If the model error is large, then η is large.

Since the rule system has only one input variable, the input-output mapping of such a fuzzy system can be approximately expressed by:

$$\eta(k+1) = \eta_{\min} + \left[\frac{E(k)}{E_{\max}}\right](\eta_{\max} - \eta_{\min}), \quad (16)$$

where [x] denotes the largest integer that is smaller than x, $\eta_{max}$ is the maximal η, $\eta_{max} \leq \lambda$, and $\eta_{min}$ usually equals 1 so that the information on the model fidelity is always available. $E_{max}$ is the allowed maximal model error and E(k) is the current model error estimation, k denotes the k-th cycle of λ generations. Every λ generations is called a control cycle.

The estimation of the current model error is carried out before the next control cycle begins. Suppose all the new data in the last η generations are valid (in aerodynamic design, some design may result in unstable fluid dynamics and therefore the data may be invalid) and the population size is P, then there will be ηP data in total. Thus, the model error is estimated as follows:

$$E(k) = \sqrt{\frac{1}{\eta P} \sum_{i=1}^{\eta P} (y(i) - y_{NN}(i))^2} \quad (17)$$

where y(i) is the true fitness value and $y_{NN}(i)$ is the fitness calculated using a feed-forward neural network model:

$$y_{NN} = \sum_{j=1}^{H} v_j \theta\left(\sum_{i=1}^{n} w_{ij} x_i\right) \quad (18)$$

where H is the number of hidden nodes, n is the number of inputs, $w_{ij}$ and $v_j$ are the weights in the input layer and output layer, and θ(.) is the logic function $$\theta(z) = \frac{1}{1 + e^{-z}} \quad (19)$$

The framework for evolutionary optimization with approximate models can be summarized as follows (see also the already explained flow-chart of FIG. 3):

```
Begin
    Initialize P(0), η(0), λ, E_max, t_max, let k=0
    for t=0 to t_max
        if (t%λ)<η(k)-1
            Use the original fitness function
            Collecting new data
        else
            Use the approximate model
        and if
        if (t%λ)=λ-1
            Estimate the local model fidelity E(k)
            Estimate η(k+1), k=k+1
            Select the data for model updating
            Update the approximate model
        end if
    end for
End
```

Recall that the fidelity of the model is estimated locally based on the error information from the last cycle. Therefore, λ should not be too large.

Weighted Online Learning Using Covariance Matrix

An important issue in on-line learning is how to select new samples for network training to improve the model quality as much as possible. A simple way is to use all the new samples, or a certain number of the most recent data, if the neural network can learn all the data well. Unfortunately, in on-line learning, only a limited number of iterations of training are allowed to reduce the computation time.

There are a number of methods for data selection in neural network training, which are usually called active learning. However, all of these methods rely on sufficient data in order to employ methods from statistics. In the problem outlined in this description, data are sparse and their collection is computationally expensive. At the same time, information about the topology of the search space and even more importantly about the direction of the search process is contained in the covariance matrix which is adapted during the evolutionary process. To exploit this information, the shape of the normal distribution, equation (8), is used to weight the newly generated samples. In this way, the neural network will put more emphasis on the data points that the evolution strategy will most probably visit in the next generation.

Suppose there are N new samples in total, then the cost function for weighted learning is given by $$E = \frac{1}{N}\sum_{i=1}^{N} p(i)(y(i) - y_{NN}(i))^2 \quad (20)$$

where, p(i) is the weight for sample i $$p(i) = \exp\left(\frac{1}{2}\vec{x}(i)^T \vec{C}^{-1} \vec{x}(i)\right) \quad (21)$$

The covariance matrix $\vec{C}$ is the one which is adapted during the evolutionary search in the CMA algorithm outlined further above. Before applying the weights to neural network learning, they need to be normalized $$p(i) = \frac{p(i)}{p_{\max}} \quad (22)$$

where $p_{max}$ is the maximal weight among p(i), i=1,2, . . . , N. In this way, the neural network is able to learn the most important samples, and those with a weight smaller than a given threshold are discarded in learning.

Application of the Present Invention: Aerodynamic Design Optimization

One of the main difficulties in aerodynamic design optimization is the tremendous time consumption in quality evaluation. Generally, a 2-D or 3-D Navier-Stokes solver with turbulence model is used for computing the fluid dynamics, which usually takes hours of CPU time to get a solution.

Figure 4:
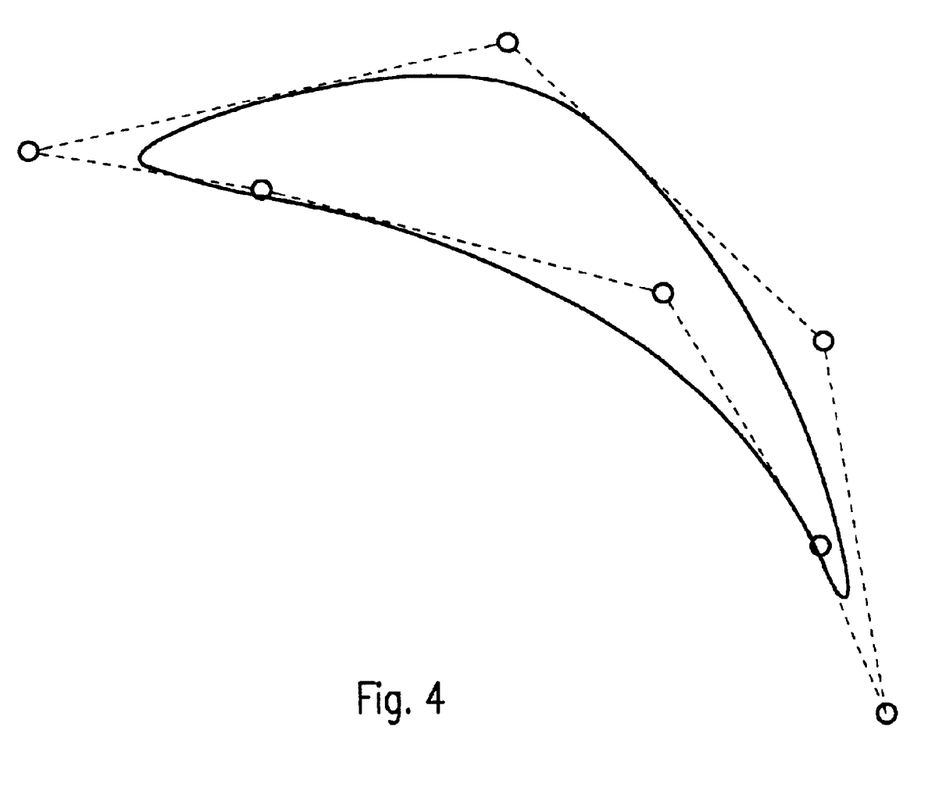
FIG. 4 shows an example of the application of the present invention on a spline encoded blade construction.

The objective of the optimization is to maximize the efficiency of a turbine blade and to minimize the bias of the outflow angle from a prescribed value. The maximization of efficiency is realized by the minimization of the pressure loss. In addition, mechanical constraints must be satisfied concerning stability and manufacturing. In order to describe the two dimensional cross section of the airfoil, a spline encoding based on the Non-Uniform Rational B-Splines is used. The spline is constructed from a set on N four-dimensional control points (x, y, z, w) that define the control polygon, where x, y, z are the three dimensional coordinates and w is a weight for the point. A two dimensional cross section is obtained by setting the z-coordinate to zero. To minimize the dimension of the search space the weights of the control points are fixed so that the representation used is a regular B-spline in this example.

Figure 5:
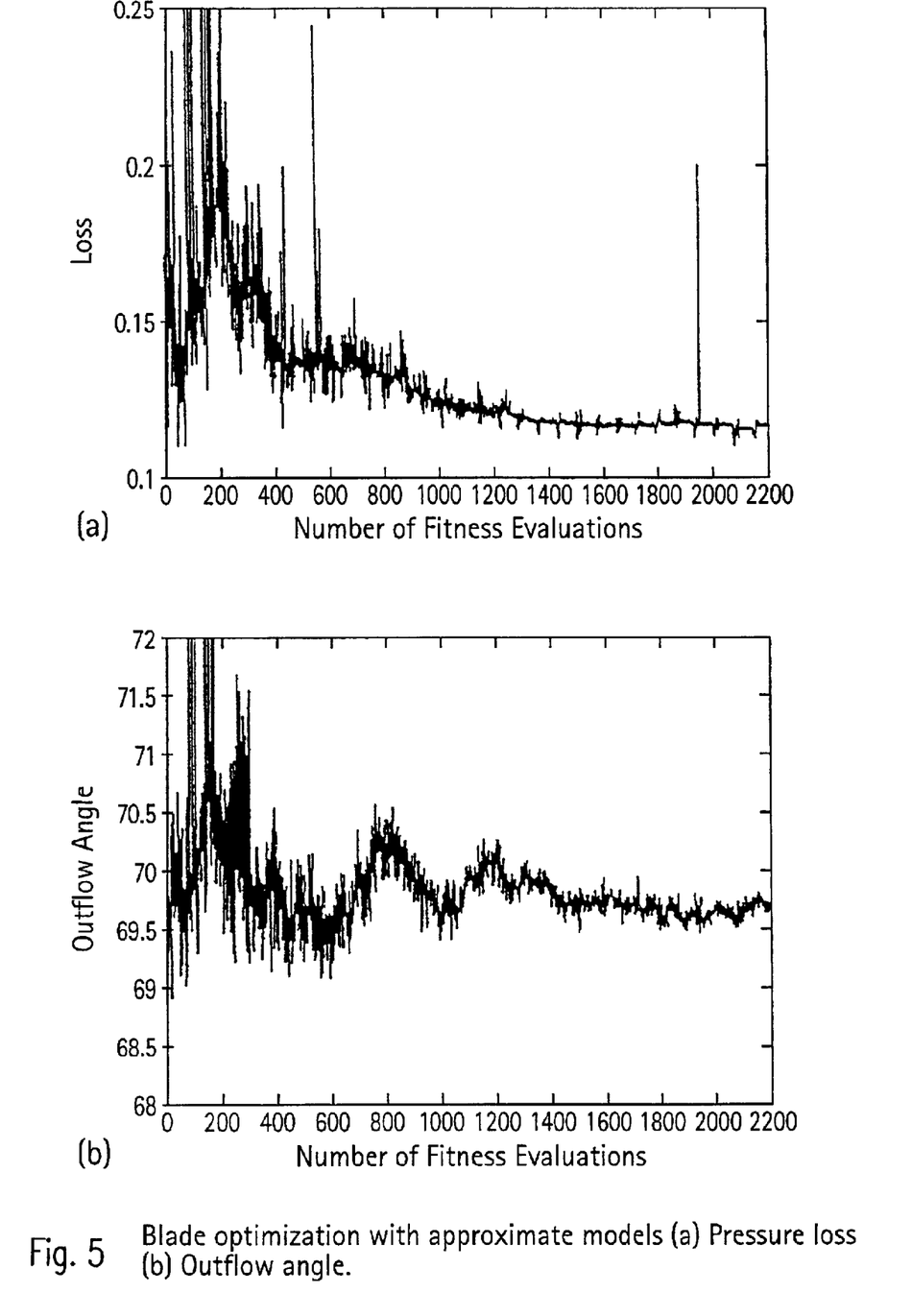
FIG. 5 shows a simulation of blade optimization with approximate models.
Figure 6:
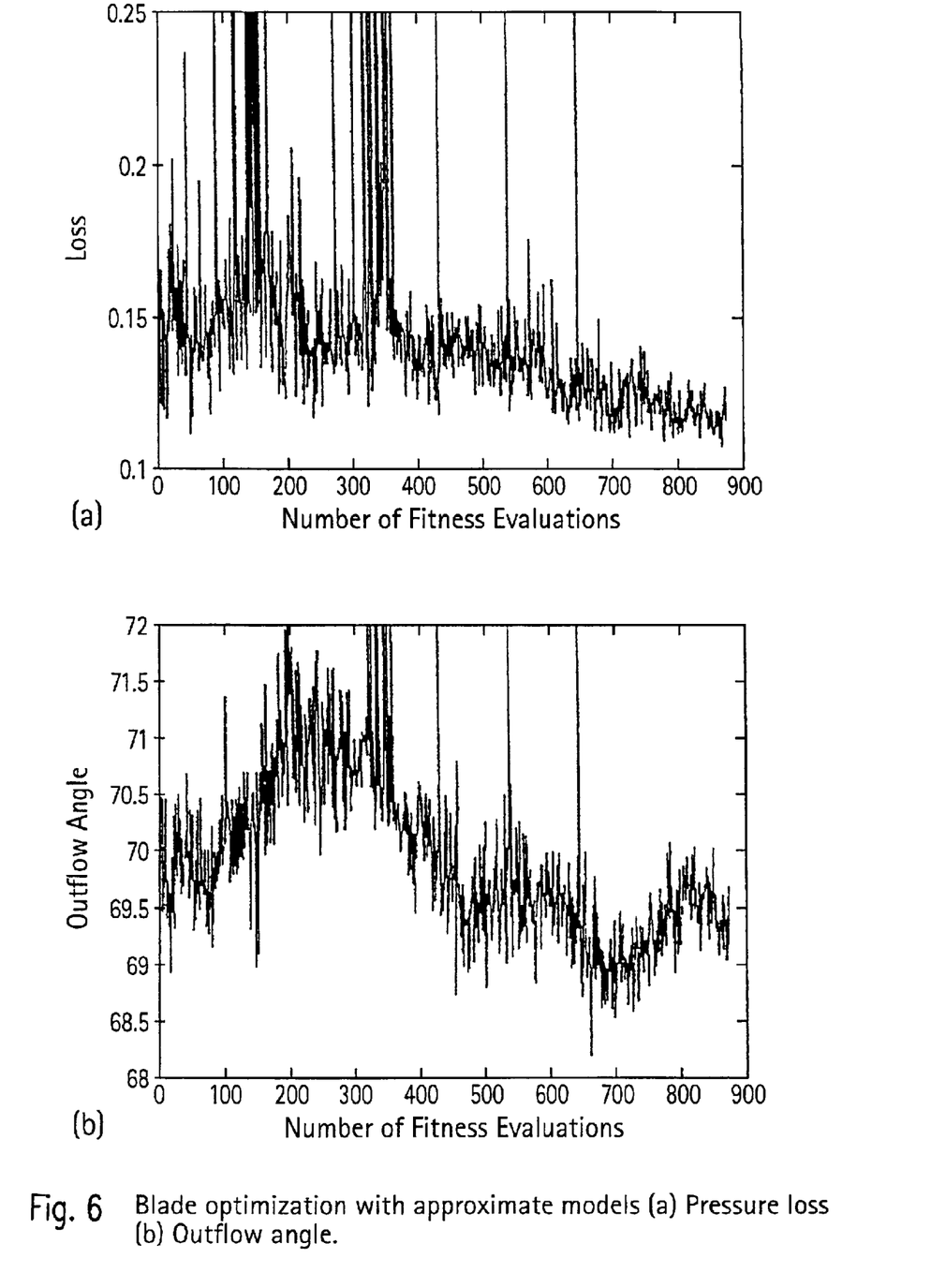
FIG. 6 shows an example for the optimization of blades without approximate models.

Therefore every control point is described only by two parameters, i.e., the x and y coordinate of the point. FIG. 4 illustrates a blade (solid line) that is generated by a spline with seven control points. The dotted line shows the corresponding control polygon. The population is initialized with a given blade to reduce the computation time. Two neural network models are used to approximate the pressure loss and the outflow angle respectively. The development of the pressure loss and the outflow angle during the evolution process are shown in FIG. 5. In 185 generations, the Navier-Stokes-Solver has been called 874 times, which corresponds to about 73 generations of evolution on the original fitness function only. Then the evolution has been run for 73 generations and the results are given in FIG. 6. The pressure loss and outflow angle are 0.110 and 69.52 with the approximate models and 0.113 and 69.51 without the approximate models. The final optimization results with approximate models are comparable to those without approximate models, but the evolution process has converged in about 120 generations, in which fewer than 874 calls of Navier-Stokes solver are needed. This achieves an over 30% reduction of computation time.

What is claimed is:

1. A method for evolutionary optimization, comprising the following steps:

setting up an initial population as parents, reproducing the parents to create a plurality of offsprings, evaluating the quality of the offsprings by means of a fitness function, said fitness function is one of an original fitness function and an approximate fitness function, and selecting at least one offspring having the highest evaluated quality value as parents, characterized in that the frequency of the use of the original fitness function is adaptable during the optimization process.

2. The method according to claim 1, wherein the frequency of use defines a control cycle terminated by the use of the original fitness function, wherein the approximate fitness function is updated at the end of every control cycle.

TABLE 1

| | Generation-based control with weighted online learning | | | | | | | | | | |
|---|---|---|---|---|---|---|---|---|---|---|---|
| No. | 1 | 2 | 3 | 4 | 5 | 6 | 7 | 8 | 9 | 10 | Average |
| Best Fitness | 20.6 | 23.9 | 22.9 | 16.7 | 25.2 | 18.1 | 36.0 | 56.8 | 38.0 | 22.5 | 25.8 |
| Number of calls | 996 | 948 | 936 | 900 | 960 | 960 | 876 | 1164 | 852 | 888 | 948 |

3. The method according to claim 1, wherein a covariance matrix of a probability density function adapted during the evolutionary optimization is used for weighting new samples at the end of every control cycle.

4. The method of claim 1, wherein the fidelity of the approximate fitness function is estimated locally at the end of a control cycle based on every use of the original fitness function to adjust the future frequency of use of the original fitness function.

5. The method of claim 1 further comprising the steps of:
calculating, at the end of each control cycle, a current model error on the basis of a difference of the result of using the original fitness function and the approximate fitness function, respectively, and
adapting, at the end of each control cycle, the future frequency of use of the original fitness function on the basis of said current model error.

6. The method according to claim 1 wherein the approximate fitness function is implemented by a neural network model.

7. The method of claim 1, wherein the quality of all offsprings of a generation is evaluated if said original fitness function is used.

8. The method of claim 1, wherein the quality of only a selected number of offsprings of a generation are evaluated if said original fitness function is used.

9. The method of claim 1 for optimizing a spline encoded problem.

10. The method of claim 1, wherein the original fitness function is calculated by a Navier-Stokes-solver.

11. A computer program stored in a computer readable medium for performing the method of claim 1.

* * * * *